Nov. 25, 1969 D. K. BENSON 3,480,918
THREE-DIMENSIONAL MEMORY HAVING PHOTON EXCITABLE
IMPURITY SEMICONDUCTOR STORAGE VOLUME
Filed April 14, 1965

INVENTOR.
David K. Benson
BY
Hovey, Schmidt, Johnson & Hovey,
ATTORNEYS.

United States Patent Office 3,480,918

Patented Nov. 25, 1969

3,480,918

THREE-DIMENSIONAL MEMORY HAVING PHOTON EXCITABLE IMPURITY SEMICONDUCTOR STORAGE VOLUME

David K. Benson, Kansas City, Mo., assignor to Midwest Research Institute, Kansas City, Mo., a corporation of Missouri Filed Apr. 14, 1965, Ser. No. 448,169

Int. Cl. G11b *7/00*

U.S. Cl. 340—173 7 Claims

ABSTRACT OF THE DISCLOSURE

A three-dimensional, optical memory has high information density and employs a storage medium consisting of a homogeneous volume of a photon excitable impurity semiconductor. Information is stored and retrieved by intersecting light beams which scan the volume of the memory. Information storage in a given volume element is effected when two recording light beams of appropriate frequencies intersect therein, causing two-step electronic transitions which transfer electrons from one kind of impurity atom site to another. This altered electron distribution, which represents the stored bit of information, remains unaltered until the volume element is interrogated by two interrogating light beams of appropriate frequencies intersecting in the volume element, such beams causing two-step-electronic transistions to the original impurity sites. The presence of a stored information bit is indicated by the emission of fluorescence radiation as the electrons return to the ground state of the original impurity sites.

This invention relates to a method of storing information in and reading out information from a three-dimensional storage array and, more specifically, to an ultra-high density information recording and readout method employing a photon excitable impurity semiconductor having particular characteristics to be set forth hereinafter.

Heretofore, information has been recorded in one-dimensional arrays, such as magnetic recordings; two-dimensional arrays, such as photographic records; and recently, three-dimensional arrays as in the core storage of digital computers. In a magnetic tape recording each memory cell (the smallest space in which one bit of information may be stored) comprises a certain finite tape length, and is approximately $5\times10^{-4}$ cm. In a two-dimensional array, the correspondiig memory cell size would be an area equal to $(5\times10^{-4})^2$ cm.$^2$. Accordingly, a volume of $(5\times10^{-4})^3$ cubic centimeters would be required in a three-dimensional array utilizing a corresponding cell dimension.

It may be readily proved that a three-dimensional memory represents a substantial improvement over one and two-dimensional memories from the standpoint of space economy if, as above, it is also assumed that corresponding cell sizes would be possible in each of the three types of arrays. For example, assuming that it is desired to have a memory with a capacity of $10^{12}$ bits of information, the linear dimensions of the respective memories would be:

one-dimensional memory $\sim 10^{12}(5\times10^{-4})=5\times10^8$ cm.

two-dimensional memory $\sim[10^{12}\cdot(5\times10^{-4})^2]^{1/2}=5\times10^2$ cm.

three-dimensional memory $\sim[10^{12}\cdot(5\times10^{-4})^3]^{1/3}=5$ cm.

The above, as stated, assumes that the memory cell of the three-dimensional memory is reduced to the same linear dimensions as is obtainable in magnetic or photographic recordings. Conventional computer core memories, however, do not permit this reduction and utilize memory elements requiring electrical connections. Consequently, the cell dimensions of a three-dimensional core memory are much larger than the linear cell dimensions of either magnetic tape or photographic records.

It is, therefore, one of the objects of the instant invention to provide a three-dimensional memory having cell dimensions comparable to that which is readily obtainable in one and two-dimensional memories, so that the physical size of the memory will be much smaller than three-dimensional memories heretofore known without sacrificing storage capacity.

As a corollary to this objective, it is an additional object to provide such a memory which is homogeneous throughout, rather than being an assembly of a number of discrete memory cell devices as in present core memories.

Although the instant invention answers the long-felt need for a compact three-dimensional memory in the computer art, the field of communications technology has also placed a burden on the capabilities of existing equipment utilized to handle high-density information, such as the telemetry from space vehicles. The theoretical limit of single channel information density or capacity is some fraction of the frequency of the transmitted carrier wave bearing the intelligence. Therefore, with the development of laser communication techniques and attendant increase in the possible carrier frequency, it is necessary that means be provided to handle the intelligence carried by the laser beam or the maximum capabilities of such transmission system cannot be realized. When it is remembered that a laser beam is thousands of times higher in frequency than ordinary microwaves, it is readily appreciated that the information density obtainable through the use of laser techniques is phenomenal, requiring that memory systems handling the intelligence be capable of fast access in both the recording and readout modes.

It is, therefore, another object of this invention to provide a memory system capable of handling information at a greater speed than memories heretofore known.

Briefly, this invention utilizes a photon excitable impurity semiconductor having particular properties which render the electrons of the impurity material capable of quantum transitions from a ground state to another state in response to photon energy representing the intelligence to be recorded in the semiconductor. When readout is desired, the semiconductor is again excited by photon energy, but of a different frequency, to effect return of these electrons to the ground state. The emission of detectable photons accompanies this return so that the sensing of the presence of these photons enables reproduction of the recorded intelligence. The memory cells of the semiconductor comprise volumetric portions or volume elements of the semiconductor which are scanned by the appropriate photon energy during recording and readout in a manner to provide a three-dimensional array.

A full and complete understanding of the operation of the instant invention will become clear as the following specification progresses, reference being had to the drawing, wherein.

Figure 1:
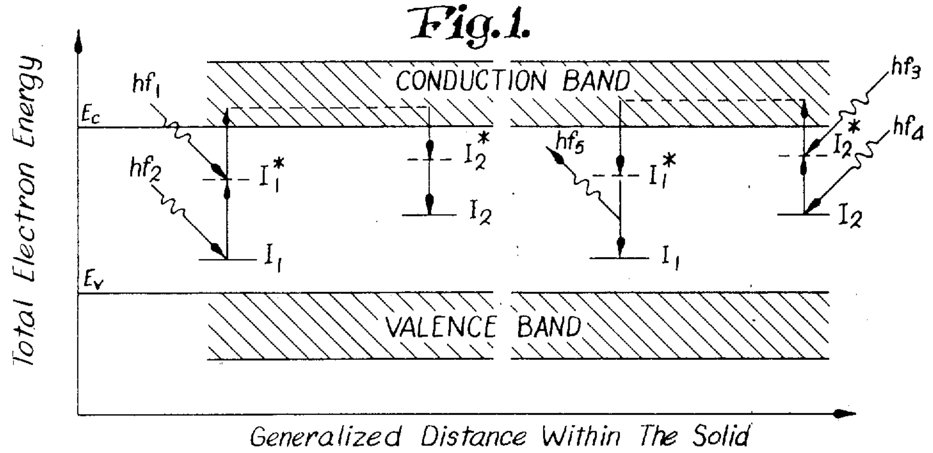
FIGURE 1 is a graphical portrayal of the quantum transitions in the semiconductor during recording and readout.

The memory structure itself comprises a homogeneous, single crystal or glass material containing rare earth impurities which absorb light. A schematic representation of the electronic energy levels in such a material is shown in FIG. 1. Prior to the addition of the impurities the single crystal or glass contains no electrons having energy levels above the level represented by $E_v$ in the graph. Thus, the electrons of the pure material all have energy levels within the valence band and are bound to their respective atoms. Therefore, the pure material prior to introduction of impurities exhibits the characteristics of an insulator.

The graph of FIG. 1 is a representation of two separate quantum transitions portrayed with reference to common axes and energy levels. The first or left-hand transition illustrates the action of the memory material during recording of intelligence therein, while the right-hand portion of FIG. 1 illustrates the quantum transitions which occur during readout of this recorded intelligence.

In order to obtain the desired electron energy levels necessary to convert the pure material from an insulator into a semiconductor, two different impurities are introduced into the pure material, these impurities having energy levels $I_1$, $I_1$*, and $I_2$, $I_2$*, respectively. The impurities are chosen so that the energy level $I_1$ is normally occupied by an electron, while $I_1$*, $I_2$, and $I_2$* are normally vacant. It should be noted that these four energy levels lie between the upper limit of the valence band $E_v$, and the lower limit of the conduction band $E_c$.

Absorption of light photons of particular frequencies by the selected impurities causes the various quantum transitions illustrated in FIG. 1. Two monochromatic beams of light having respective frequencies $f_1$ and $f_2$ are employed to initiate the first two step transition which elevates the electron normally at the ground state $I_1$ to the conduction band. This is illustrated in FIG. 1 by the light photon $hf_1$ and the photon $hf_2$ ($h$ equals Planck's constant). A photon of energy $hf_2$ causes transition of the electron from level $I_1$ to the excited state $I_1$*, the photon of energy $hf_1$ then effecting a transition of the electron from energy level $I_1$* to the conduction band where the electron is in the mobile state. The material then possessses conductive properties and the electron is mobile.

Motion of the electron in the conduction band ceases when the same becomes trapped at the level $I_2$ of an atom of the other impurity. Such other impurity is normally electron deficient and thus has an available trapping level.

It may be seen from the foregoing that the presence or absence of the photon energy $hf_1$ and $hf_2$ determines whether or not the electron at ground state $I_1$ in the one impurity will be ejected from that impurity atom and captured by an atom of the other impurity at level $I_2$. Thus, it will be appreciated that the presence or absence of photons $hf_1$ and $hf_2$ can correspond to useful intelligence, such as the "0" or "1" bit of a binary code. It will be assumed for purposes of this initial general description of the invention that the presence of an electron at the level $I_2$ corresponds to a "1" bit while the presence of an electron at the ground state $I_1$ corresponds to the "0" bit.

Having stored the binary information in the semiconductor in the manner described above, readout is effected by directing two monochromatic beams of light having frequencies $f_3$ and $f_4$, respectively, into the semiconductor. This is illustrated in the right-hand portion of the graph where photons $hf_3$ and $hf_4$ are shown. It is evident that photon $hf_4$ effects transsition of the electron from the $I_2$ level to the $I_2$* level, while photon $hf_3$ causes transition of the electron into the conduction band where it is again mobile and may re-combine with the original impurity atom. As the electron returns to the $I_1$ level, a photon of luminescence $hf_5$ is emitted which may be sensed by a multiplier phototube or a photo transistor. In this manner, the "1" bit is represented by the emission of photon $hf_5$ while the "0" bit corresponds to no action within the semiconductor when photons $hf_3$ and $hf_4$ converge thereupon.

Figures 2, 3:
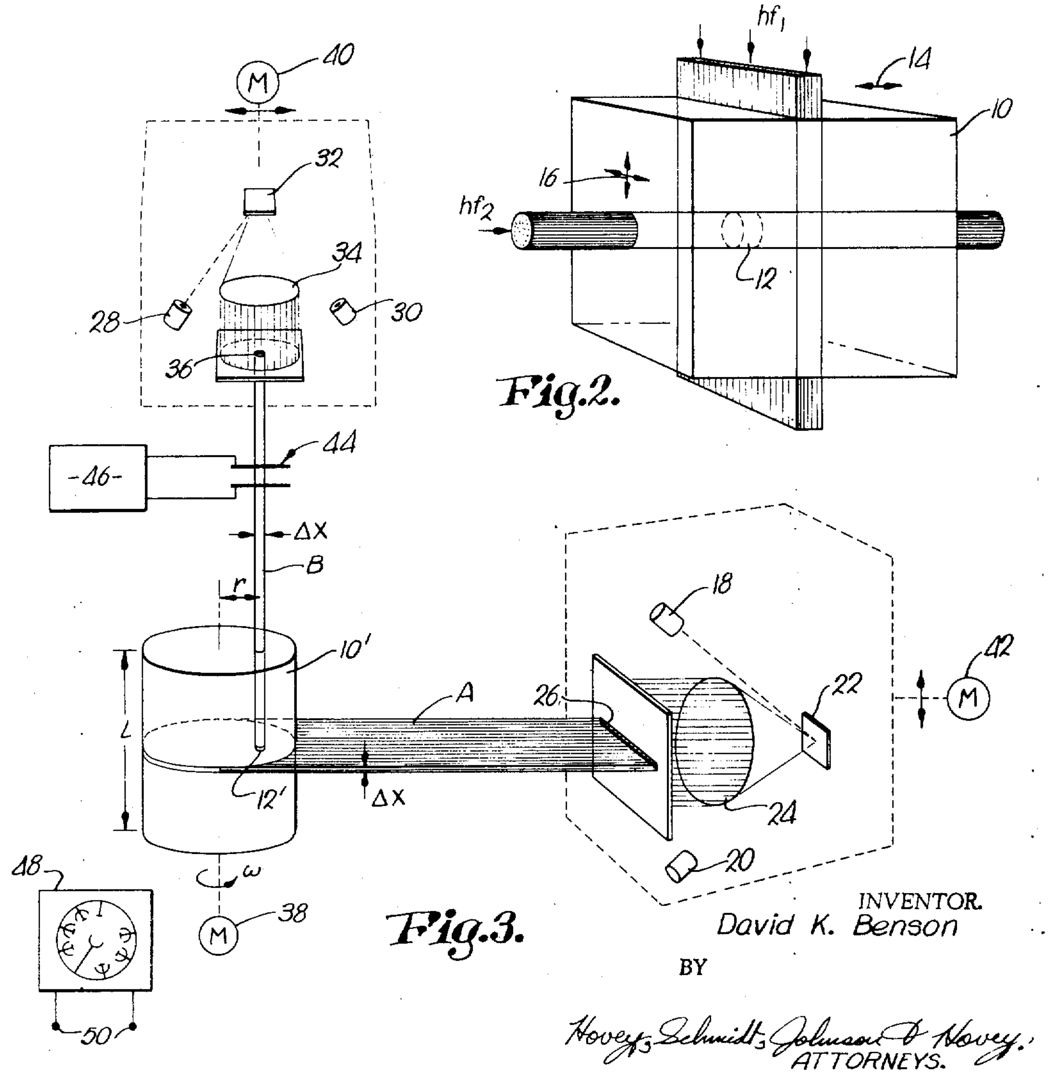
FIG. 2 is a diagrammatic representation of the recording of intelligence in a cubical semiconductor material.
FIG. 3 is a diagrammatic illustration of an example of a system for recording and reading out information contained in a cylindrical semiconductor memory.

FIGURE 2 illustrates a manner of utilizing the electron action above described in a practical memory system. The cube 10 comprises the semiconductor material, monochromatic beams $hf_1$ and $hf_2$ being shown intersecting one another at a cylindrical portion or volume element 12 of semiconductor 10. The arrow 14 illustrates the sweep path of beam $hf_1$, the orthogonal arrows 16 showing the sweep paths of the beam $hf_2$.

Beam $hf_1$ travels vertically downwardly through the semiconductor 10 and, if this vertical path is maintained while $hf_1$ is swept back and forth in the direction as illustrated by arrow 14, it will be appreciated that a number of volume elements 12 will be scanned by the intersection of the two beams $hf_1$ and $hf_2$ along the entire length of beam $hf_2$ within semiconductor 10. If $hf_2$ is then similarly moved along a sweep path which ultimately causes $hf_2$ to pass through every portion of semiconductor 10, then multitude of volume elements 12 will be scanned by the intersecting beams until the entire semiconductor has been subjected to the simultaneous presence of the two light beams. Although it will be appreciated that constant scanning by the two beams will trace a locus of intersection within semiconductor 10 rather than define a number of separate volume elements 12, the concept of scanning a number of volume elements is useful from the standpoint of analyzing the information storage capability of the semiconductor since each element 12 may be looked upon as a memory cell capable of information storage.

The placing of information in semiconductor 10 may be effected by modulating the intensity of beam $hf_2$ while the intensity of beam $hf_1$ is maintained constant. The reverse is also a possible mode of operation, but modulation of $hf_2$ is preferred in order to minimize the possibility of thermal excitation causing electron transition into the conduction band once the electron reaches the excited $I_1$* state.

In order to read out the stored information, beams $hf_1$ and $hf_2$ are replaced by monochromatic beams of frequencies $f_3$ and $f_4$, respectively, and these readout beams are scanned along the same sweep paths as the recording beams $hf_1$ and $hf_2$. As successive volume elements 12 are excited by the intersection of the readout beams $hf_3$ and $hf_4$, photons $hf_5$ will emanate from those volume elements containing electrons trapped at the $I_2$ level. In the example discussed above where the electron transition to the $I_2$ level corresponded to a "1" bit, it is evident that the emission of photons $hf_5$ during scanning would represent a recorded "1" bit, while the lack of $hf_5$ emission would correspond to a record "0" bit.

Utilization of the memory semiconductor is not limited, however, to digital information. It should be understood that a number (hundreds or even thousands) of electron transitions actually occur when a volume element 12 is subjected to the intersecting recording beams $hf_1$ and $hf_2$. The number of transitions would depend upon the intensities of the two beams. Thus, if $hf_1$ is maintained at a constant intensity while $hf_2$ undergoes sinusoidal intensity modulation, successive volume elements 12 will contain different numbers of electrons trapped at the $I_2$ state and, when readout is effected, the photons $hf_5$ will vary in number as these volume elements are scanned so as to reproduce the sinusoidal modulation. Thus, information "bits" as used in this specification is intended to encompass bits of intelligence in a broad sense.

A three-dimensional information storage system employing the concepts discussed above is illustrated in FIG. 3. Here, a cylindrical semiconductor 10' is employed as the memory. Beam A contains energy $hf_1$ or $hf_3$ depending on which of two light sources 18 or 20 is in operation. Sources 18 and 20 may comprise standard monochromatic optical radiation sources of Lasers capable of delivering a light beam of a desired frequency. The generated beam is reflected from a mirror 22 which is located at the focal point of acallimating lens 24 which directs parallel rays through a slit 26 to form a beam of width $\Delta x$.

Sources 28 and 30 are employed with a mirror 32 and a collimating lens 34 in the same manner to produce beam B of frequency $f_2$ or $f_4$ depending upon which of the sources 28 or 30 is in operation. The parallel rays from lens 24 are blocked except for those which pass through a circular aperture 36, forming a cylindrical light beam which intersects beam A at a cylindrical volume element 12' within semiconductor 10'.

Cylinder 10' is operably coupled with the shaft of a constant speed electric motor 38 which rotates the cylinder about its axis at an angular velocity of $\omega$ revolutions per second. Beam B is scanned along a radius of the cylinder by a torque motor 40 which shifts the entire beam generating assembly in the directions indicated by the arrow. Torque motor 42 shifts the assembly which generates beam A in a direction axially of the cylinder as illustrated by the arrow.

Modulation of beam B during the recording mode may be effected by a variety of conventional and well known means, a Kerr cell 44 being illustrated for this purpose. A Kerr cell is an electrooptical device which comprises a pair of transparent, electrically conductive plates having a liquid dielectric therebetween such as a nitrobenzene solution. Beam B is passed through the parallel plates while the electric field therebetween is varied by the modulating signal to, in turn, effectively attenuate the beam intensity as it passes through the dielectric. In this manner, the Kerr cell serves as an electrically variable optical filter having an opacity determined by the potential across the transparent plates. Apparatus 46 is shown having an output coupled with the plates of Kerr cell 44, such apparatus 46 comprising any one of a number of conventional devices, such as the write system of a digital computer, from which the intelligence to be recorded is obtained.

The photons $hf_5$ emitted during readout may be detected by a photomultiplier stage illustrated diagrammatically at 48. The output 50 of the photomultiplier stage delivers an electrical signal having an instantaneous amplitude responsive to the number of photons $hf_5$ cotemporaneously sensed by the photosensitive cathode of the photomultiplier tube, in accordance with well known phototube action. Manifestly, this output signal is identical to the input signal initially recorded in the memory by the modulation of beam B of frequency $hf_2$ by the Kerr cell 44.

If motor 42 is operated to steadily scan beam B back-and-forth over the length of the rotating cylindrical semiconductor 10' while the modulated beam B is swept stepwise along a radius of the cylinder, the locus of beam intersections will resemble concentric, tightly spiraled coils. Assuming that the radius of cylinder 10' is 7 cm., and that only the outer two-centimeter annulus is used for storage, each spiral contains $2\pi r/\Delta x$ memory cells per turn where $r$ is the radius of the spiral and $\Delta x$ the cell dimension, so that the rate of information input or output is $(2\pi r/\Delta x)\omega$ bits/sec. The number of turns per spiral is $L/\Delta x$ (where $L$=cylinder length) and the number of such spirals $2/\Delta x$, so that the total information stored is $2\pi rL/\Delta x^3$. The required rate of scan for beam A is $\Delta x\omega$ and for beam B (average) is $$\Delta x(\Delta x\omega/L)=\Delta x^2\omega/L$$

For $\omega=1000$ revolutions per sec., $L=15$ cm., and $\Delta x=5\times10^{-4}$ cm., we have input rate $=6\times10^7$ bits/sec.

total capacity$=6\times10^{12}$ bits scan rate A$=5\times10^{-1}$ cm./sec.

scan rate B$=2\times10^{-5}$ cm./sec.

By way of comparison, the information capacity of an American television channel is approximately $5\times10^6$ bits/sec.; thus, the above scheme would be a suitable single channel recorder of $10^6$ sec. (approximately 300 hr.) of televised information. The same information recorded optically on Pan-X photographic film would cover $1.5\times10^7$ cm.$^2$ of film area.

MATERIAL SELECTION

As stated previously, the general classification of materials to be considered in forming the semiconductor memory is impurity semiconductors (or extrinsic semiconductors). More specifically, the selected semiconductor should belong to both of two classes of materials known as phosphors and photoconductors. Necessary characteristics of the material are:

(1) The material must be amenable to fabrication into a bulk solid with uniform optical properties. The volume will normally be greater than one cubic centimeter.

(2) The material must contain the following specified electron energy states illustrated schematically in FIG. 1—

(a) Bound electron states $I_1$ and $I_2$ which have associated excited states $I_1^*$ and $I_2^*$ between the valence band and the band of unbound electron states (conduction bands).

(b) Electron state $I_2$ will have a higher energy than $I_1$ and must be normally (at thermodynamic equilibrium) unoccupied.

(c) The energy differences $I_1^*-I_1$, $I_2^*-I_2$, $E_c-I_1^*$, and $E_c-I_2^*$ must be several times larger than the photon energy at the temperature of operation. At room temperature these differences should be greater than 0.25 electron volt. This is to prevent spurious operation of the memory by phonon action.

(d) The relative positions of $I_1^*$ and $I_2^*$ on the energy scale are not important, but the differences $E_c-I_1^*$, $E_c-I_2^*$, $I_1^*-I_1$, $I_2^*-I_2$, and $I_2-E_v$ must all be different in magnitude. The effect of this is to cause the various frequencies $f_1$, $f_2$, $f_3$, $f_4$ and $f_5$ to be different in order to satisfy the equation $E=hf$ and provide a means of controlling operation of the memory by excitation of the semiconductor with the desired frequency or frequencies.

As a corollary to the above, desirable characteristics of the semiconductor which would improve the efficiency of operation are:

(1) Long lifetime for the excited energy states $I_1^*$ and $I_2^*$.

(2) No optical absorption characteristics which would overlap those involved in the transistions $I_1$ to $I_1^*$, $I_1^*$ to the conduction band, $I_2$ to $I_2^*$, and $I_2^*$ to the conduction band.

(3) Chemical and physical stability.

Examples of specific materials for the memory include two doubly activated alkaline-earth sulfides SrS: Ce, Sm and SrS: Eu, Sm. Both of these substances are infrared stimulable phosphors which exhibit the requisite energy levels. A detailed analysis of the characteristics of these phosphors and information as to their preparation and precise chemical composition is contained in an article by Keller, Mapes and Cheroff in Physical Review, vol. 108, pp. 663–676 (1957).

By way of illustration, and with reference to the exemplary diagram of FIG. 1, in the utilization of the phosphor SrS: Eu, Sm the europium impurity $Eu^{+2}$ contains electrons at the ground state $I_1$. Excitation of the semiconductor by photon energy $hf_1$ and $hf_2$ causes a transition of the $Eu^{+2}$ atom to $Eu^{+3}$, resulting in the release of an electron which is then free to become trapped at the $I_2$ level of a samarium $Sm^{+3}$ atom. The presence of $Sm^{+2}$ atoms records the information in the memory, whereupon return of the samarium atoms to the $Sm^{+3}$ configuration is effected during readout when the semiconductor is energized by photon energy $hf_3$ and $hf_4$. Manifestly, the frequencies of the two component photon energy ($hf_1$ and $hf_2$) required to effect the two step transition to record the information and the frequencies of the two energy components ($hf_3$ and $hf_4$) necessary for the two step read-out transition are all different and are each determined according to the relatiionship $f=E/h$, where E is the electron energy of the particular energy level from which the associated step of the transition is to occur, and $h$ is Planck's constant.

Various ceramic materials containing two rare earth activators such as calcium tungstate containing neodynium and either holium or thulium are also suitable for use as the impurity semiconductor, the chemistry of these particular materials being fully described by K. Nassau in "Proceedings of the Third Conference on Rare Earth Research" (Clearwater, Fla., 1963).

Additionally, various glasses containing rare earths such as fused silica containing terbium and europium are also suitable, and are described by W. F. Nelson, et al., in "Proceedings of the Third Conference on Rare Earth Research" (Clearwater, Fla., 1963).

Having thus described the invention, what is claimed as new and desired to be secured by Letters Patent is:

1. A method of recording and reading out intelligence comprising:
   - producing photon energy of a first and a second frequency;
   - controlling the delivery of said energy of one of said frequencies in accordance with the characteristics of said intelligence;
   - scanning a photon excitable impurity semiconductor with said energy of the other of said frequencies, said semiconductor being characterized by the property of being excitable by photon energy of said first frequency to effect transition of electrons therein from a ground state to a first excited, metastable state and then excitable by photon energy of said second frequency to effect transition of the excited electrons to a stable energy level, and further characterized by the property of being thereafter excitable by photon energy of a third frequency to effect transition of electrons at said stable level to a second excited, metastable state and then excitable by photon energy of a fourth frequency to effect return of the electrons in said second excited state to said ground state in conjunction with emission of detectable photons of a fifth frequency;
   - directing said energy of said one frequency to successively different portions of said semiconductor during said scanning to effect intersecton of the first and second frequency energy at successively different volume elements of said semiconductor to cause two step electron transitions from said ground state to said stable level only at volume elements excited by both the first and the second frequency energy, whereby to record said intelligence in said volume elements;
   - producing a pair of intersecting photon beams containing said energy of the third frequency and said energy of the fourth frequency, respectively; and
   - scanning said volume elements with the intersection of said beams to excite the electrons at said stable level to cause two step electron transitions from said stable level back to said ground state and attendant emission of said detectable photons, whereby to read out the intelligence previously recorded in said volume elements.

2. A method of recording intelligence comprising:
   - producing photon energy of a first and a second frequency;
   - controlling the delivery of said energy of one of said frequencies in accordance with the characteristics of said intelligence;
   - scanning a photon excitable impurity semiconductor with said energy of the other of said frequencies, said semiconductor being characterized by the property of being excitable by photon energy of said first frequency to effect transition of electrons therein from a ground state to an excited, metastable state and then excitable by photon energy of said second frequency to effect transition of the excited electrons to a stable energy level; and
   - directing said energy of said one frequency to successively different portions of said semiconductor during said scanning to effect intersecton of the first and second frequency energy at successively different volume elements of said semiconductor to cause two step electron transitions from said ground state to said stable level only at volume elements excited by both the first and the second frequency energy, whereby to record said intelligence in said volume elements.

3. The invention of claim 1, wherein said semiconductor comprises the infrared stimulable phosphor SrS: Ce, Sm.

4. The invention of claim 1, wherein said semiconductor comprises the infrared stimulable phosphor SrS: Eu, Sm.

5. The invention of claim 1, wherein said semiconductor comprises calcium tungstate containing the rare earth activators neodynium and holmium.

6. The invention of claim 1, wherein said semiconductor comprises calcium tungstate containing the rare earth activators neodynium and thulium.

7. The invention of claim 1, wherein said semiconductor comprises fused silica containing terbium and europium.

References Cited

UNITED STATES PATENTS

| | | | |
|---|---|---|---|
| 3,229,221 | 1/1966 | Sorokin et al. | 330—4.3 X |
| 3,296,594 | 1/1967 | Van Heerdeo | 340—173 X |
| 3,341,825 | 9/1967 | Schrieffer | 340—173 |
| 3,410,624 | 11/1968 | Schmidt | 350—157 X |

OTHER REFERENCES

S. P. Keller et al.: "Quenching, Stimulation and Exhaustion Studies on Some Infrared Stimulable Phosphors," Physical Review, v. III No. 6, Sept. 15, 1958, pp. 1533–1539.

P. P. Feofilov: "Phototransfer of an Electron in $MeF_2$-Eu, Sm Monocrystals," Optics and Spectroscopy, v. 12, pp. 296–297, 1961.

R. S. Title: "Non-Destructive Sensing an Infrared Stimulable Phosphor," IBM TDB, v. 2, No. 4, December 1959, p. 129.

BERNARD KONICK, Primary Examiner

J. A. BREIMAYER, Assistant Examiner

U.S. Cl. X.R.

330—4.3